Dec. 8, 1925.

D. R. B. SHEPHARD

FISHWAY

Filed Aug. 28, 1924

1,564,903

INVENTOR:
D. R. B. Shephard
BY
*Pierre Barnes*
ATTORNEY

Patented Dec. 8, 1925.

1,564,903

UNITED STATES PATENT OFFICE.

DANIEL R. B. SHEPHARD, OF SEATTLE, WASHINGTON.

FISHWAY.

Application filed August 28, 1924. Serial No. 734,594.

*To all whom it may concern:*

Be it known that I, DANIEL R. B. SHEPHARD, a citizen of the United States, residing at Seattle, in the county of King and State of Washington, have invented certain new and useful Improvements in Fishways, of which the following is a specification.

This invention relates to fishways; and its object, generally, is the improvement of devices of this character to render the same more serviceable and adapted for use with dams of considerable elevation.

A further object is to provide a fishway composed of a plurality of inclined ways or troughs disposed between a succession of resting and terminal pools or stations associated in a manner to afford an easy ascent for the fish.

More specific objects and advantages of the invention will appear in the following description.

The invention consists of a fishway comprising a series, or a succession of series, of inclined troughs and basins, depending upon the height the fish are to ascend and also with regard to the space available within which a fishway may be built.

The invention further consists in the novel construction, adaptation, and combination of parts hereinafter described and claimed.

In the accompanying drawing,—

Figure 1:
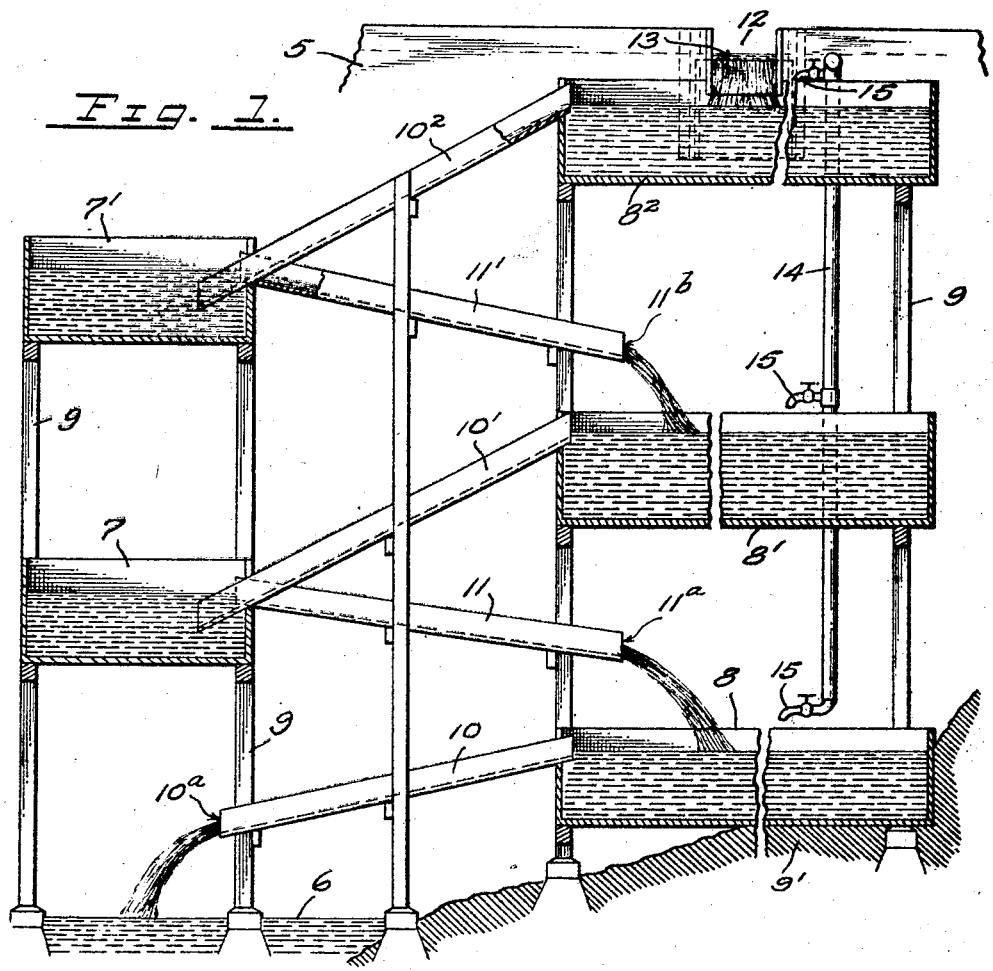
Figure 2:
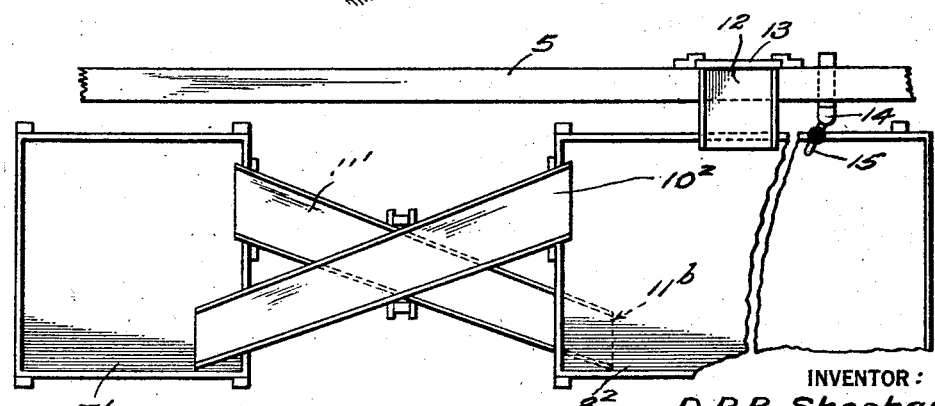

Figure 1 is a vertical longitudinal section of devices embodying my invention shown applied; and Fig. 2 is a plan view of the same.

In said drawing, the reference numeral 5 represents a dam of suitable construction provided in a water course for confining water at an elevation above the normal level of the stream as denoted by 6.

The fishways are located at the downstream side of the dam whereby fish may ascend into the water confined by the dam at its upstream side.

In carrying out the invention, I provide one or more water receptacles as 7, $7^1$, two being shown in Fig. 1, hereinafter designated as resting pools, which are arranged in vertically spaced relation, and may be disposed one above the other.

Located in horizontally spaced relation from said resting pool or pools and transversely of the stream are vertically spaced water receptacles as 8, $8^1$ and $8^2$, three being shown, which are designated hereinafter as feeding pools. Said feeding pools are of greater capacity, preferably, than the resting pools.

The pool structures may be built of wood, metal, cement or other suitable material and are supported by cribbing or framework 9 of known or suitable construction; or, as illustrated with respect to the pool 8, may be built or supported directly upon the ground, indicated by $9^1$ where the contour or formation of a stream bank permits.

The respective resting and feeding pools, alternately, are located at progressively greater elevations, as shown—a feeding pool, 8, is located lowermost, then a resting pool 7 at a higher elevation, then a second feeding pool still higher and so on, alternately, to the uppermost pool which, in the illustrated embodiment, is shown as a feeding pool.

Inclined water outlet troughs $10^1$ and $10^2$ are provided for the upper feeding pools $8^1$ and $8^2$ and extend into the resting pools 7 and $7^1$, respectively, at the next lower elevations.

The troughs above referred to extend into the bodies of water within the resting pools 7 and $7^1$. An inclined water outlet trough 10 for the lowermost feeding pool 8 has its discharge end $10^a$ located at a distance above the body of water 6 in the stream below the dam. The resting pools 7 and $7^1$ have extending therefrom inclined water-outlet troughs 11 and $11^1$ with their discharge ends $11^a$ and $11^b$ located some distance above the water levels of the feeding pools 8 and $8^1$. Water is supplied mainly into the uppermost of the pools, as $8^2$, through a chute 12 provided in the upper portion of the dam 5 and the quantity of water passing therethrough is regulated by means of a gate 13, or an equivalent.

For supplying water to protect fish in said feeding pools from the ill effects of stagnant water in the event of an interruption or stoppage of water delivery through either the chute 12 or any of said troughs, there is provided an auxiliary water supplying means. Such means, as herein shown, consists of a stand pipe 14 receiving water from the upstream side of the dam, and having valved outlets 15 for the delivery of water into the respective feeding pools.

When the apparatus is operated as a fish ladder to enable fish to pass the dam when traveling upstream for spawning or other purposes, water is supplied by means of the chute 12 to the upper pool and thence flows through the successive troughs from pool to pool.

The troughs leading to and from each of the feeding pools are preferably crossed as shown in Fig. 2, so that fish ascending the fishway enter the respective troughs from the down stream sides of both the feeding and resting pools and are thus caused to take a general upstream direction when ascending from one pool to another.

The troughs 10, 11 and $11^1$, into which the fish can reach only by jumping, are advantageously disposed at a smaller angle from the horizontal than the troughs $10^1$ and $10^2$, into which the fish may swim from the respective resting pools.

In the use of the invention disclosed in the drawing, fish swimming upstream in approaching the dam are attracted by the fall of water from the end $10^a$ of the trough 10 and then jumps upwardly into the latter and thereupon utilizes the water traveling through the trough 10 as a medium to swim into the pool 8.

The fish after remaining for a while in pool 8 will be attracted by water falling thereinto from the trough 11 and to reach the latter must jump thereinto and then propel itself by swimming in order to reach the second pool 7 whence the fish swim through the flow of water within trough $10^1$ to reach the second feeding pool 8.

In the manner described above with reference to fish ascending from pool 8 to pool $8^1$, the fish ascend from pool $8^1$ to pool $8^2$, the troughs $11^1$ and $10^2$ being arranged substantially like the troughs 11 and $10^1$ and function in a similar manner.

It is to be understood that all of the pools are designed for use as stations in which the fish may rest in their ascent to an upstream spawning place. Some of the pools, as 8—$8^2$, are designed furthermore as stations in which the fish may feed while resting and to this end the feeding pools should be of considerable size to accommodate many fish at a time.

An important characteristic of my invention is in the use of assemblies, each assembly constituting a series of troughs and one or more pools and arranging such assemblies in superimposed relations to a sufficient number for attaining a required elevation.

In the illustrated embodiment, the fishway as a whole comprises a lowermost series of members consisting of the trough 10 and feeding pool 8; a second series of troughs 11, $10^1$ and pools 7, $8^1$; and a third series of troughs $11^1$, $10^2$ and pools $7^1$, $8^2$—each series employing a terminal pool such as 8, $8^1$ or $8^2$ and an auxiliary pool as 7 or $7^1$ as a basin wherein the fish may rest and turn intermediate the respective series, when the height of the same is considerable.

The construction and operation of the invention will, it is believed, be apparent from the foregoing description, although it is to be understood that, within the scope of the following claims, changes in the sizes, number of troughs and pools and arrangement of same may be made to suit particular installations.

What I claim, is,—

1. In apparatus of the character described, a fishway comprising two water receiving basins disposed at different elevations and in transversely spaced relation, and two vertically inclined troughs for fish to ascend therein to the successive basins and from the lower to the higher basin, said basin being arranged to have the upper end of each trough located further upstream than its lower end.

2. In apparatus of the character described, a plurality of fishways disposed in vertically spaced relation each of said fishways having a feeding basin, and a water-carrying trough extending downwardly therefrom, certain of the fishways having a fish resting basin into which extends the outlet end of the respective trough, and an inclined water-carrying trough extending downwardly from a resting basin and having its lower end terminate above the feeding basin of the fishway next below.

3. In apparatus of the character described, the combination of a plurality of fishways disposed in series one above the other, each of the fishways having two basins disposed at different elevations and water discharging means consisting of inclined troughs extending from the respective basins, the lower ends of the water discharging troughs of the lower basin of each fishway being spaced vertically above the water level in the upper basin of the fishway next below.

4. In apparatus of the character described, a fishway having an elevated terminal basin, means to supply water thereto a second basin located at a lower elevation, an inclined water-carrying trough for converging water from the upper to the lower basin, an inclined water discharging trough extending from the second named basin, each of said troughs sloping downwardly in the direction of the water current therein the outlet end of the second named trough being located at an elevation such that a fish can only enter the same by jumping upwardly, and means to supply water to the terminal basin.

5. In apparatus of the character described, the combination of a plurality of fish feeding and resting basins disposed alternately at progressively greater elevations, inclined troughs for discharging water from the upper basin into the basin at the next lower elevation and from the latter to the basin next below and so onto the lowest of said basins, means to supply water to the uppermost basin, and means to supply water independently of the first named means to the feeding basins selectively.

Signed at Seattle, Washington, this 6th day of August 1924.

DANIEL R. B. SHEPHARD.